Sept. 15, 1942.   F. N. OSMUN   2,295,683
ADJUSTER
Filed May 15, 1941
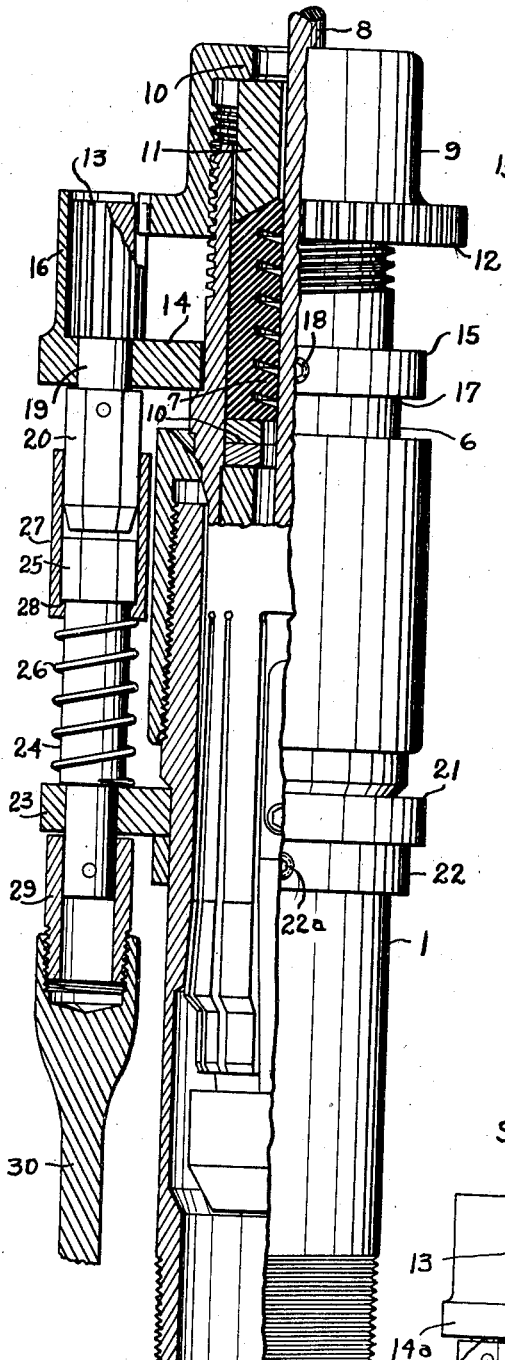
Fig. 1.
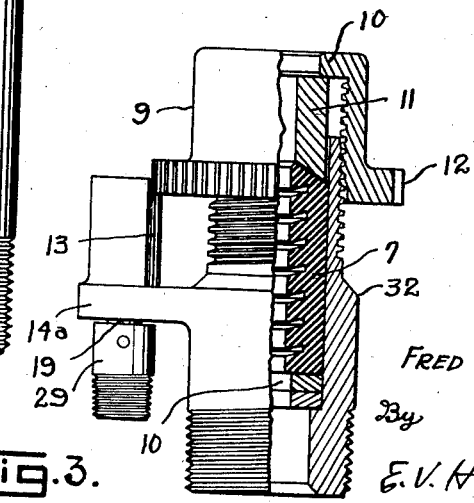
Fig. 2.
Fig. 3.
Fig. 4.
Inventor
FRED N. OSMUN
By
Attorney Patented Sept. 15, 1942

2,295,683

UNITED STATES PATENT OFFICE 2,295,683

ADJUSTER

Fred N. Osmun, Houston, Tex.

Application May 15, 1941, Serial No. 393,593

5 Claims. (Cl. 286—16)

This invention relates to an adjuster.

An object of the invention is to provide a line wiper attachment specially designed for adjusting the packing in the wiper around the wire line. In carrying on certain operations in connection with a well, such as swabbing, bailing, wire line coring and the like, the tools are operated in the well by means of a wire line and the wire line works through a line wiper which includes wiping rubbers which closely surround the line to prevent the passage of liquid upwardly around the line as the line is manipulated. It is very desirable that the wiper rubbers be properly adjusted to the line so as to prevent the escape of liquid and also so as to prevent undue wear on the rubbers.

The line wiper includes an adjusting nut for properly adjusting the wiper rubbers about the line. When the line is being run into the well, it is desirable that the rubbers be so adjusted as to allow the line to run freely and to minimize the wear on the rubbers but when the line is being elevated, particularly when swabbing or bailing, it is desirable that the rubbers be adjusted tightly about the line to prevent leakage.

It has been the common practice to station a man in the derrick to adjust the wiper rubbers as required, but in manipulating the line, it at times accumulates a certain amount of slack which allows a whipping of the line as it is fed off of the reel thus endangering the derrick man while making the adjustments referred to.

It is the prime object of the present invention to provide an adjuster of the character described that may be applied to a line wiper and operated from a safe place on the derrick floor.

It is another object of the present invention to provide an adjuster of the character described which is of very simple construction, composed of few parts, may be readily assembled and mounted on the wiper and which is very efficient in use.

With the above and other objects in view the invention has particular relation to certain novel features of construction, arrangement of parts and use, examples of which are given in this specification and illustrated in the accompanying drawing, wherein:

Figure 1 shows a side elevation, partly in section, of a line wiper showing a sectional view of the adjuster mounted thereon.

Figure 2 shows a top plan view.

Figure 3 shows a side elevation, partly in section, of another embodiment, and

Figure 4 shows a side view of the line wiper mounted for use showing the adjuster mounted thereon.

Referring now more particularly to the drawing wherein like numerals of reference designate similar parts in each of the figures, the numeral 1 designates the body of the line wiper which, in use, is usually attached to the upper end of a section of pipe 2 commonly known as the lubricator. This lubricator 2 may be connected to the upper end of the well tubing 3 which carries, at its upper end, a gate valve 4 and which has a discharge pipe 5 leading off from it beneath said valve. The particular type of line wiper shown in Figure 1 embodies also a stuffing box unit 6 which fits into the main body 1 and this stuffing box unit contains the line wiping rubber or rubbers 7 which fit closely about the wire line 8 through which the tools are operated in the well.

It is not believed necessary to fully describe the construction and operation of the type of line wiper shown in Figure 1 as it is fully disclosed in United States Patent No. 2,097,016, issued on October 26, 1937.

Threaded onto the upper end of the stuffing box unit 6, by means of coarse threads, there is an adjusting nut 9 having an inside annular flange 10 at its upper end which bears against the upper end of the gland 11 and the lower end of this gland abuts the upper end of the wiping rubbers 7, said rubbers being seated on the rings 19 supported within the stuffing box unit 6.

Accordingly, when the nut 9 is turned in one direction, the gland 11 will be forced downwardly against the wiper rubbers to contract the same into close fit with the wire line 8 and when said nut is turned in the other direction, the wiper rubbers will be relieved thus allowing the wire line to run more freely therethrough.

The nut 9 is provided with an external spur gear 12 which is in mesh with a vertically elongated spur pinion 13, as shown more accurately in Figure 1. The spur pinion 13 is supported on a laterally extended ear 14 which is formed on the ring 15 and is shielded by an upstanding hood 16 formed integrally with said ear. The ring 15 is supported on a suitable stop 17 and is held securely thereon against turning by a suitable set screw 18. It should be fitted over the upper end of the stuffing box unit before the nut 9 is threaded onto said unit.

The spur pinion 13 is fixed to a suitable vertical shaft 19 which rotates in a bearing in the ear 14 and pinned on the lower end of the shaft 19 there is a driven clutch member 20 which is polygonal in cross-section.

A lower ring 21 is rotatable on the body 1 and is supported thereon by means of an annular stop 22 which may be secured on the body by means of a set bolt 22a. The lower ring 21 has a laterally extended ear 23 which is provided with a bearing to receive the reduced lower end of the driving shaft 24.

On the upper end of the shaft 24 there is an enlarged head 25 of the same cross-sectional shape as that of the driven clutch member 20.

Supported on the shaft 24, by means of a coil spring 26 there is a sleeve-like driving clutch member 27 in which the head 25 fits snugly. The lower end of the driving clutch member 27 has an inside shoulder 28 engageable with the lower end of the head 25 to prevent detachment of the driving clutch member 27 from the shaft 24.

The coil spring 26 surrounds the shaft 24 and is supported on the ear 23.

If the driving shaft 24 should be out of alignment with the driven clutch member 20 and it should be desired to operatively connect them, the driving clutch member 27 may be forced downwardly, collapsing the spring 26 and the shaft 24 may then be swung around until it is aligned with the driven clutch member 20 and the sleeve-like driving clutch member then released and the spring 26 will force it over the driven clutch member 20 so as to operatively connect the shaft 24 with the shaft 19. The ring 22 is readily turnable about the body 1 to permit the two shafts to be thus clutched together.

Pinned to the lower end of the shaft 24, there is a conventional externally threaded sucker rod pin to which a section of the conventional sucker rod 30 may be attached. The lower end of this sucker rod extends down to near the derrick floor and, if desired, may be formed into a crank 31 for easy operation. By turning this crank it is obvious that the shafts 24 and 19 will be correspondingly turned, the pinion rotated and the nut 9 turned so as to run it up or down as desired and so as to relax or compress the wiper rubbers for the purposes hereinabove explained. It is apparent that this adjustment can be made from a safe place.

The spur pinion 13 is made of such length that when the nut 9 is screwed upwardly the teeth of the gear 12 will run out of mesh with the teeth of the gear 13 before the nut 9 has been completely unscrewed from the stuffing box unit 6 so that said nut will not be liable to become detached. In such event the nut 9 should be screwed downwardly by hand until said teeth again engage. The nut 9 is therefore not liable to become detached from the wiper so as to release any pressure that might be in the well. When it is desired to remove the line wiper from the well the tools on the wire line 8 are drawn up to the lubricator 2 and the valve 4 is closed so as to close the top of the well and the lubricator 2 with the wiper thereon may then be detached from the well tubing. However, in elevating the tools in the lubricator, if they are elevated too far they will strike the lower end of the stuffing box unit 6 and detach and elevate it above the body 1 thus disconnecting the clutch member 20 from the clutch member 27. In such event when the stuffing box unit 6 is again lowered into the body the driving clutch member 27 may be lowered by hand as hereinabove explained and the lower driving assembly swung around on the body 1 until the clutch member 27 aligns with the clutch member 20 and said clutch member 27 then released and it will be elevated by the spring 26 into clutching relation with the clutch member 20.

The adjuster may be used on other types of line wiper than that shown in Figure 1. Another type is shown in Figure 3 wherein the numeral 32 designates the stuffing box unit which may be connected directly to the upper end of the lubricator 2 and which contains the wiper rubbers 7 supported therein in the same manner as illustrated in Figure 1. In this form the gland 11 is employed which is interposed between the flange 10 of the nut 9 and the upper end of the wiper rubbers 7. In this form the nut 9 is threaded on the upper end of the stuffing box unit 32 and has the external annular spur gear 12 which is in mesh with the vertically elongated spur pinion 13. This pinion 13, however, is supported on a laterally extended ear 14a which is formed integrally with the stuffing box unit 32. The spur pinion 13 is fastened to the upper end of the shaft 19 which works through a bearing in the ear 14a and to the lower end of which the sucker rod pin 29 is pinned. This pinion 13a may be turned by suction of the sucker rod 30 attached to the pin 29 in the same manner as explained in connection with Figure 1 and the nut 9 thus run up or down to relax or compress the wiper rubbers 7 for the purposes stated.

The drawing and description are illustrative merely while the broad principle of the invention will be defined by the appended claims.

What I claim is:

1. The combination with a line wiper having a passageway therethrough for a line and having sealing means therein to form a seal about the line and an adjusting nut threaded onto the wiper for applying a compressive force to, and for relieving the same from, the sealing means, of a gear on the nut, a pinion rotatably mounted on the wiper and in mesh with the gear, means through which the pinion is rotated, said pinion and pinion rotating means being mounted to be relatively revolved about the axis of the wiper into alignment when misaligned.

2. The combination with a line wiper having a nut threaded thereon for applying a compressive force to, and for relieving the same from, the line sealing means of the wiper, of a gear on the nut, a pinion rotatably mounted on the wiper and in mesh with the gear, a driven shaft for rotating the pinion, a driving shaft for rotating the pinion shaft, said shafts being mounted to be relatively revolved about the axis of the wiper to align the shafts when misaligned, a releasable clutch for clutching the shafts when in alignment and means through which the driving shaft may be rotated.

3. An attachment for a line wiper having an adjusting nut threaded thereon for applying a compressive force to, and for relieving the same from, the line sealing means in the wiper, a gear on the nut, a pinion rotatably mounted on the wiper and in mesh with said gear, the threaded connection between the nut and wiper being longer than the geared connection of the intermeshing teeth of the gear and pinion so that said teeth will disengage before the nut is unscrewed from the wiper and means through which the pinion is rotated to rotate the nut.

4. An attachment for a line wiper which has a nut threaded thereon to apply a compressive force to, or to relieve the same from, a sealing means about a line through the wiper, said attachment comprising a gear on the nut, a pinion rotatably mounted on the wiper and in mesh with the gear, a driven shaft on the pinion, a driving shaft mounted on the wiper, said shafts being relatively adjustable about the axis of the wiper to align them when misaligned, a releasable clutch for clutching the shafts for simultaneous rotation, means through which the driving shaft is rotated, the threaded connection between the nut and wiper being longer than the geared connection between the intermeshing teeth of the pinion and gear to cause said intermeshing teeth to disengage before the nut is completely unscrewed.

5. An attachment for a line wiper which has a nut threaded thereon to apply a compressive force to, or to relieve the same from, a sealing means about a line through the wiper, said attachment comprising a gear on the nut, a pinion rotatably mounted on the wiper and in mesh with the gear, a shield about the pinion, a ring on the wiper, a driven shaft on the pinion, a driving shaft mounted to rotate on the ring, said ring being adjustable to bring said shafts into alignment when misaligned, a releasable clutch for clutching the shafts for simultaneous rotation, means through which the driving shaft is rotated, the threaded connection between the nut and wiper being longer than the geared connection between the intermeshing teeth of the pinion and gear to cause said intermeshing teeth to disengage before the nut is completely unscrewed.

FRED N. OSMUN.